United States Patent
Wang et al.

(10) Patent No.: US 10,574,311 B2
(45) Date of Patent: Feb. 25, 2020

(54) INTEGRITY AND QUALITY MONITORING AND SIGNALING FOR SOUNDING AND REDUCED FEEDBACK

(71) Applicant: MediaTek Singapore Pte. Ltd., Singapore (SG)

(72) Inventors: James June-Ming Wang, San Marino, CA (US); Jianhan Liu, San Jose, CA (US); Vishakan Ponnampalam, San Jose, CA (US); Chao-Chun Wang, Taipei (TW); Huanchun Ye, Cupertino, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 51 days.

(21) Appl. No.: 16/013,060

(22) Filed: Jun. 20, 2018

(65) Prior Publication Data
US 2018/0302130 A1    Oct. 18, 2018

Related U.S. Application Data (63) Continuation of application No. 15/211,899, filed on Jul. 15, 2016, now abandoned, which is a
(Continued)

(51) Int. Cl.
*H04B 7/0452*    (2017.01)
*H04L 25/02*    (2006.01)
(Continued)

(52) U.S. Cl.
CPC ......... *H04B 7/0452* (2013.01); *H04B 7/0417* (2013.01); *H04B 7/065* (2013.01);
(Continued)

(58) Field of Classification Search
None
See application file for complete search history.

(56) References Cited

U.S. PATENT DOCUMENTS

| | | | | |
|---|---|---|---|---|
| 6,084,919 A | * | 7/2000 | Kleider | H04B 1/707 375/285 |
| 7,027,409 B2 | * | 4/2006 | Cain | H04B 7/2643 370/252 |

(Continued)

OTHER PUBLICATIONS

International Search Report and Written Opinion dated Jan. 31, 2012.

*Primary Examiner* — Hong S Cho
(74) *Attorney, Agent, or Firm* — McClure, Qualey & Rodack, LLP

(57) ABSTRACT

A method of sounding and feedback with channel quality information and reduced overhead is provided. A receiving station receives a sounding signal transmitted from an access point over multiple sub-channels of a wide channel in a wireless network. The receiving station detects channel quality based on the received sounding signal for each sub-channel. The receiving station then performs channel estimation based on the received sounding signal and thereby determining feedback information. Finally, the receiving station transmits a feedback message to the access point, the feedback message contains NULL feedback information, reduced feedback information, or channel integrity/quality indicators based on the channel quality information for each sub-channel. Based on the feedback message, the access point may repeat the sounding process, narrow the transmission bandwidth, or select only stations who have indicated uncorrupted channel sounding for MU-MMO transmission.

20 Claims, 7 Drawing Sheets

METHOD OF SOUNDING AND FEEDBACK WITH CHANNEL QUALITY INFORMATION

Related U.S. Application Data continuation of application No. 13/635,360, filed as application No. PCT/US2011/057034 on Oct. 20, 2011, now abandoned.

(60) Provisional application No. 61/405,749, filed on Oct. 22, 2010, provisional application No. 61/405,350, filed on Oct. 21, 2010.

(51) Int. Cl.
*H04B 7/0417* (2017.01)
*H04B 7/06* (2006.01)
*H04L 1/00* (2006.01)

(52) U.S. Cl.
CPC ......... *H04B 7/0617* (2013.01); *H04B 7/0632* (2013.01); *H04B 7/0658* (2013.01); *H04L 1/0026* (2013.01); *H04L 1/0028* (2013.01); *H04L 25/0226* (2013.01); *H04L 25/0228* (2013.01); *H04B 7/063* (2013.01)

(56) References Cited

U.S. PATENT DOCUMENTS

| | | | | |
|---|---|---|---|---|
| 7,142,864 B2* | 11/2006 | Laroia | H04L 5/0007 | 455/450 |
| 7,649,831 B2* | 1/2010 | Van Rensburg | H04B 7/0639 | 370/203 |
| 7,764,931 B2 | 7/2010 | Kim et al. | | |
| 7,872,981 B2* | 1/2011 | Meylan | H04B 7/0417 | 370/252 |
| 7,873,023 B2* | 1/2011 | Ihm | H04L 5/0044 | 370/329 |
| 8,325,644 B2* | 12/2012 | Sampath | H04L 1/02 | 370/312 |
| 8,743,784 B2* | 6/2014 | Sampath | H04L 27/2613 | 370/203 |
| 2005/0237992 A1* | 10/2005 | Mishra | H04L 12/2854 | 370/349 |
| 2006/0159003 A1* | 7/2006 | Nanda | H04W 16/10 | 370/203 |
| 2007/0191065 A1* | 8/2007 | Lee | H04L 1/02 | 455/562.1 |
| 2008/0043888 A1* | 2/2008 | Bhukania | H04L 25/03006 | 375/346 |
| 2008/0080405 A1* | 4/2008 | Shin | H04B 7/265 | 370/280 |
| 2008/0137634 A1* | 6/2008 | Hassan | H04L 5/0007 | 370/343 |
| 2008/0153506 A1* | 6/2008 | Yin | H04L 1/0026 | 455/452.2 |
| 2008/0187062 A1* | 8/2008 | Pan | H04B 7/0417 | 375/260 |
| 2010/0014475 A1* | 1/2010 | Horiuchi | H04B 7/155 | 370/329 |
| 2010/0254272 A1 | 7/2010 | Chun et al. | | |
| 2010/0238824 A1* | 9/2010 | Farajidana | H04B 7/0417 | 370/252 |
| 2011/0013603 A1* | 1/2011 | Li | H04B 7/0602 | 370/338 |
| 2011/0032872 A1* | 2/2011 | Han | H04B 7/0639 | 370/328 |
| 2011/0096796 A1* | 4/2011 | Zhang | H04B 7/0669 | 370/474 |
| 2011/0149857 A1* | 6/2011 | Lee | H04B 7/0671 | 370/328 |
| 2011/0222472 A1* | 9/2011 | Breit | H04B 7/0626 | 370/328 |
| 2011/0243021 A1* | 10/2011 | Ponnuswamy | H04L 41/22 | 370/252 |
| 2011/0310827 A1* | 12/2011 | Srinivasa | H04B 7/0434 | 370/329 |

\* cited by examiner (PRIOR ART)
FIG. 1

METHOD OF SOUNDING AND FEEDBACK WITH CHANNEL QUALITY INFORMATION

FIG. 10

FIG. 11

INTEGRITY AND QUALITY MONITORING AND SIGNALING FOR SOUNDING AND REDUCED FEEDBACK

CROSS REFERENCE TO RELATED APPLICATIONS

This application is a Continuation of U.S. application Ser. No. 15/211,899, which is a Continuation of U.S. application Ser. No. 13/635,360 filed on Nov. 15, 2012, which claims priority under 35 U.S.C. § 119 from U.S. Provisional Application No. 61/405,350, entitled "Integrity and Quality Monitoring and Signaling for Sounding and Feedback," filed on Oct. 21, 2010; U.S. Provisional Application No. 61/405,749, entitled "Integrity and Quality Monitoring Signaling for Sounding and Reduced Feedback," filed on Oct. 22, 2010, Ser. No. 13/635,360 is also a National Stage application of PCT Application No. PCT/US2011/057034, the subject matter of which is incorporated herein by reference.

TECHNICAL FIELD

The disclosed embodiments relate generally to wireless network communications, and, more particularly, to sounding and feedback in multi-user multiple-input multiple-output (MU-MIMO) communications.

BACKGROUND

Multi-user multiple-input multiple-output (MU-MIMO) transmission is becoming a new system technique to enable high system capacity in both the upcoming IEEE 802.11ac and the LTE (long-term evolution) standards. As compared to single-user MIMO (SU-MIMO), MU-MIMO has several key advantages. First, MU-MIMO allows for a direct gain in multiple access system capacity proportional to the number of access point antennas. Second, MU-MIMO allows the higher degree spatial multiplexing gain to be obtained without the need for higher number of antennas at the mobile stations by keeping the intelligence and cost at the access point. Third, MU-MIMO appears immune to most propagation limitations plaguing SU-MIMO communications because multiuser diversity can be extracted even in a simple line of sight (LOS) propagation environment. As a result, the LOS propagation, which causes degradation in single user spatial multiplexing schemes, is no longer a problem in the multiuser setting.

In contrast to the SU-MIMO transmission, where the mobile station receivers are equipped with sufficient number of antennas (equal to or greater than the number of spatial streams) and the capability of the signal processing to estimate the channel and to separate the spatial streams, it is crucial in a MU-MIMO transmission for the access points or routers to bear the most of the burden in the signal processing and hardware complexity to allow for simpler mobile station implementation. To achieve this aim, the access point or router should apply transmit beamforming (precoding), computed from channel information acquired in the MU-MIMO downlink channel sounding and feedback to achieve an orthogonal (or near-orthogonal) transmission of multiple streams to multiple users, i.e., eliminating (or reducing) the amount of mutual interference between the transmission to multiple mobile stations. Under this condition, each mobile station only receives the spatial stream(s) intended for itself and not the interference from the spatial stream(s) intended for other mobile stations. With reduced number of spatial streams directed toward individual mobile stations, all mobile stations only need to be equipped with sufficient number of antennas for processing the spatial streams intended for itself and not worrying about eliminating the interference from other spatial streams.

Figure 1:
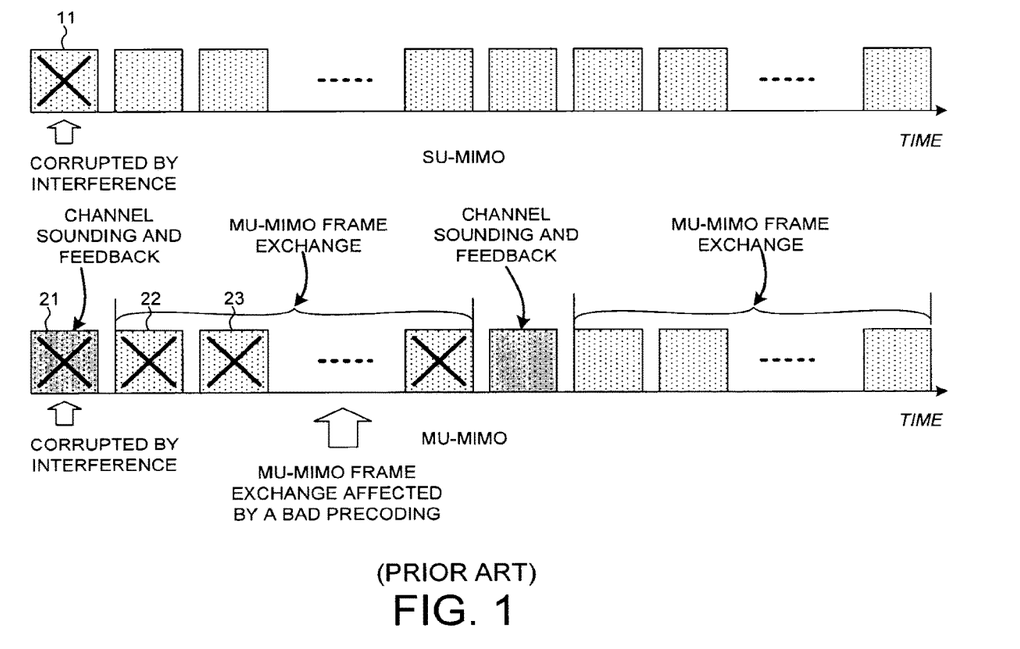
FIG. 1 (prior art) illustrates typical SU-MIMO and MU-MIMO processes in a wireless system.

FIG. 1 (Prior Art) illustrates a typical SU-MIMO and MU-MIMO process in a wireless communication system. For SU-MIMO, the receiver spatial processing occurs during the long training fields (LTFs) in the preamble before the arrival of the data payload. The receiver spatial processing is performed on a packet-by-packet basis. If the receiver spatial processing is not done correctly, for example due to interference, only that packet (e.g., packet 11 in FIG. 1) is affected and the erroneous transmission can be corrected by acknowledgement and re-transmission protocol as long as interference is no longer present in subsequent re-transmission.

For MU-MIMO, on the other hand, the channel knowledge and antenna weights at the transmitter are not updated frequently. The process of channel sounding and feedback add a significant overhead to the system processing and it is typically performed at intervals comparable to the channel coherent time. Note that this sounding and feedback process for MU-MIMO is identical for that for transmit beamforming. The same discussion presented here would also apply to transmit beamforming. If the incorrect channel knowledge, e.g., due to received sounding signal corrupted by interference, is used at the transmitter, the sequence of frame exchanges based on the same transmit antenna weights are affected and the resultant communication errors are not correctible through the acknowledgement and re-transmission protocol. In the example of FIG. 1, when sounding and feedback 21 is corrupted by interference, the sequence of MU-MIMO frame exchanges 22, 23 . . . are affected. Additionally, since the transmit beamforming weight is computed from aggregate channel measurements from multiple receivers, one incorrect feedback may produce a corrupted transmit (precoding) weights for all devices involved in the sounding and feedback process. Thus, it is critical to ensure the integrity and/or quality of the channel information obtained from the sounding process.

Currently, there is no mechanism or protocol in the 802.11ac system to allow fast recovery from situation that sounding process is corrupted. Since wideband channel bandwidths are proposed in the 802.11ac, the sounding process is more susceptible to interferences, especially to sub-channel interferences. Although there is channel protection mechanism such as RTS and CTS protocol in the IEEE802.11 standards for improving the channel integrity and/or quality of the channel sounding and feedback process, such protection mechanism adds to overhead of the process and is typically not employed.

SUMMARY

A method of sounding and feedback with channel quality information and reduced overhead is provided. A receiving station receives a sounding signal transmitted from an access point over a wide channel in a wireless network. The sounding signal is transmitted over one or multiple sub-channels of the wide channel. The receiving station detects channel quality based on the received sounding signal for each sub-channel. The receiving station then performs channel estimation based on the received sounding signal and thereby determining feedback information. Finally, the receiving station transmits a feedback message to the access point, the feedback message contains NULL feedback information, reduced feedback information, or channel integrity/ quality indicators based on the channel quality information for each sub-channel. Based on the feedback message, the access point may repeat the sounding process, narrow the transmission bandwidth, or select only stations who have indicated uncorrupted channel sounding for MU-MIMO transmission.

In one embodiment, the feedback message contains an integrity/quality indicator that indicates the detected channel quality for each sub-channel. The integrity is a binary measure of whether or not the channel measurement as described is corrupted. The quality indicator, on the other hand, is a quantitative measure of the extent the channel measurement is corrupted. In a first example, a conventional technique of checking CRC of the sounding packet is utilized for all sub-channels. In a second example, a technique of CCA (Clear Channel Assessment) prior to the arrival of the sounding packet is utilized. In a third example, the fixed pattern in the sounding signal is verified for monitoring the integrity and/or quality of the sounding signal.

In another embodiment, a primary sub-channel suffers significant channel degradation. To reduce overhead, the receiver does not transmit any beamforming report in the feedback by transmitting a NULL feedback message, which may be indicated by a NULL feedback indicator in the MIMO control subfield.

In yet another embodiment, a secondary sub-channel suffers significant channel degradation. To reduce overhead, the receiver transmits reduced feedback information, which may be indicated by an integrity/quality indicator in the MIMO control subfield. The reduced feedback information includes only beamforming report for non-corrupted primary sub-channels, while beamforming report for corrupted sub-channels are not included in the feedback message.

The sounding and feedback process for MU-MIMO channel sounding and feedback (with multiple stations receiving sounding signal from the AP) is identical for that for transmit beamforming sounding and feedback (with a single station receiving sounding signal from the AP). The same discussion presented here would also apply to transmit beamforming.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

A multiple-input multiple-output (MIMO) wireless system employs multiple ($N_T$) transmit antennas and multiple ($N_R$) receive antennas for data transmission. A MIMO channel formed by the $N_T$ transmit and $N_R$ receive antennas may be decomposed into $N_S$ spatial channels, where $N_S <= \min\{N_T, N_R\}$. The $N_S$ spatial channels are used to transmit $N_S$ independent data streams to achieve greater overall throughput. While single-user MIMO (SU-MIMO) considers access to the multiple antennas that are physically connected to each individual terminal (e.g., user), multi-user MIMO (MU-MIMO) allows a terminal to transmit (or receive) signals to (or from) multiple users simultaneously. The typical MU-MIMO usage scenario in IEEE 802.11ac involves an access point (AP) or router first acquiring the MIMO channel state information (CSI) through channel sounding, computing and applying transmit beamforming (precoding) weights, and then simultaneously transmitting multiple spatial streams to more than one mobile stations (STAs). With proper transmit beamforming (precoding), partial spatial processing is done at the access point to separate the spatial streams among the multiple users, and the remaining spatial processing is done at the receivers to decode the multiple spatial streams received.

Figure 2:
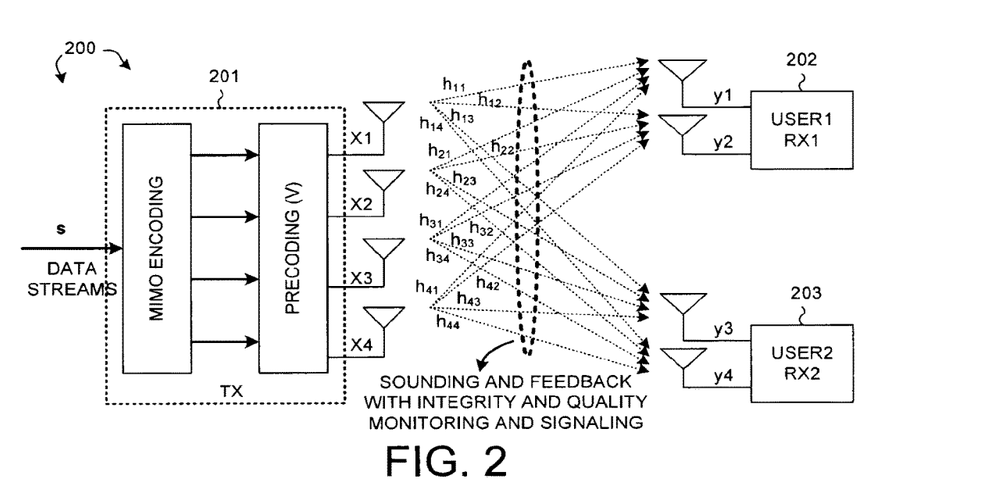
FIG. 2 illustrates a MU-MIMO scheme in a wireless system in accordance with one novel aspect.

FIG. 2 illustrates a MU-MIMO scheme in a wireless system 200 in accordance with one novel aspect. Wireless system 200 comprises an access point AP 201 (TX), a first mobile station STA 202 (user 1 or RX1), and a second mobile station STA 203 (user 2 or RX2). In the example of FIG. 2, four spatial streams are transmitted by the TX antennas with two spatial streams intended for each receiver. The complex coefficients $h_{11}$, $h_{12}$, $h_{13}$, and $h_{14}$ represent the transmission from $x_1$ antenna arriving at $y_1$, $y_2$, $y_3$, and $y_4$ antennas. The complex coefficients $h_{21}$, $h_{22}$, $h_{23}$, and $h_{22}$ represent the transmission from $x_2$ antenna arriving at $y_1$, $y_2$, $y_3$, and $y_4$ antennas. The complex coefficients $h_{31}$, $h_{32}$, $h_{33}$, and $h_{32}$ represent the transmission from $x_3$ antenna arriving at $y_1$, $y_2$, $y_3$, and $y_4$ antennas. Finally, the complex coefficients $h_{41}$, $h_{42}$, $h_{43}$, and $h_{42}$ represent the transmission from $x_4$ antenna arriving at $y_1$, $y_2$, $y_3$, and $y_4$ antennas. The transmission from each of the four TX antennas arrives at each of the four RX antennas. The input-output relationship can be described as:

$$x = Vs \quad (1)$$

$$y = Hx + n \quad (2)$$

where
s is a vector of input data symbols
x is a vector to be sent from transmit antennas after applying precoding matrix V
V is the precoder matrix, which can be derived from channel response matrix H
H is the channel response matrix n is the noise y is a vector to be received by receive antennas The goal of the transmit beamforming (precoding) is to generate desired transmit array antenna patterns such that two spatial streams are beamed toward the first receiver (RX1) while nulled toward the second receiver (RX2) and that the other two spatial streams are beamed toward the second receiver (RX2) while nulled toward the first receiver (RX1). In other words, if precoder matrix V is applied properly, then RX1 will only see the first two spatial streams and RX2 will only see the other two spatial streams. As a result, RX1 only needs two antennas to resolve the first two spatial streams while RX2 also only needs two antennas to resolve the other two spatial streams. With the proper transmit beamforming at the transmitter (TX), the overall receive antennas can be reduced from eight to four and a simpler system configuration can be achieved.

In order to apply MU-MIMO beamforming (precoding), the transmitting station is required to have the knowledge of the channel response matrix H. This requires the receiving stations to measure and estimate the channel response matrix H and then feedback the channel response matrix H to the transmitting station via sounding and feedback process. If the channel measurement is corrupted by, say interference, the transmit beamforming (precoding) matrix V derived from the feedback will lead to subsequent corrupted MU-MIMO frame exchange. The sequence of corrupted MU-MIMO frame exchange is not correctible via the protocol of acknowledgement and re-transmission. Because the process of sounding and feedback imposes significant overhead, especially for MIMO-OFDM systems where multiple receiving stations are involved, it is desirable to perform the sounding and feedback procedure as infrequently as possible based on the coherent time of the channel. As a result, a corrupted transmit beamforming (precoding) matrix V will tend to be used for the duration until the next sounding and feedback.

In one novel aspect, a sounding and feedback process with enhanced robustness is utilized between transmitting and receiving stations. The integrity and/or quality of the channel sounding process is monitored, an integrity and/or quality indicator is provided in the feedback, and null or reduced feedback information is provided in the case of corruption. Note that this sounding and feedback process for MU-MIMO is identical for that for transmit beamforming. The same discussion presented here would also apply to transmit beamforming.

Figure 3:
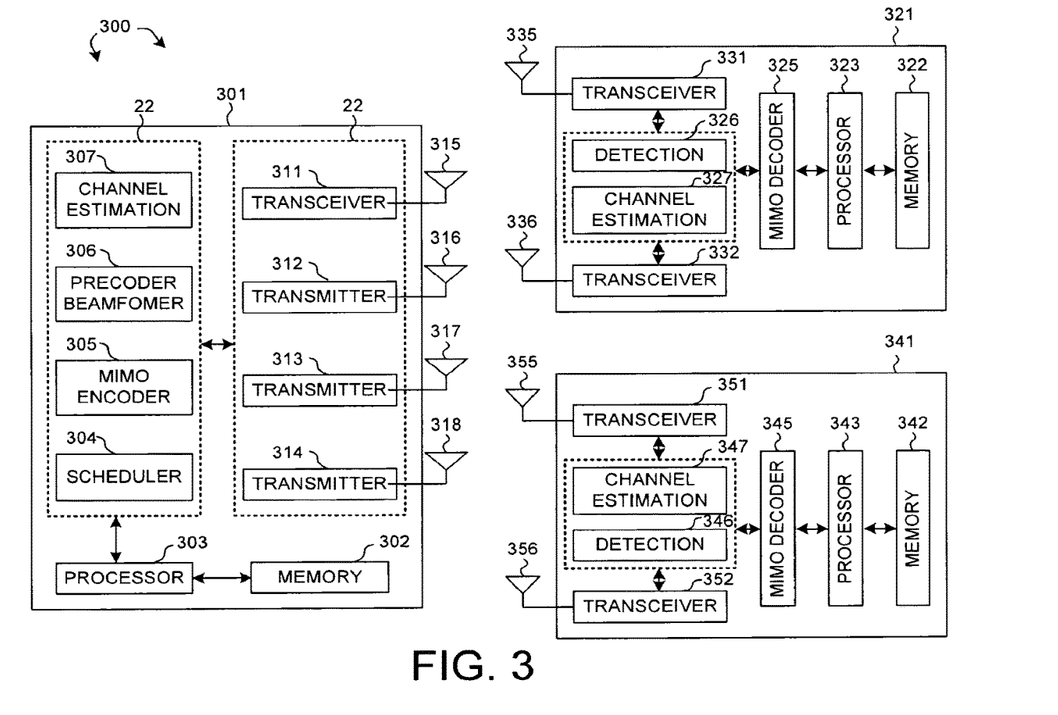
FIG. 3 illustrates simplified block diagrams of an access point and two stations in a wireless system in accordance with one novel aspect.

FIG. 3 illustrates simplified block diagrams of an access point AP 301 and two mobile stations STA 321 and STA 341 in a wireless system 300 in accordance with one novel aspect. AP 301 comprises memory 302, a processor 303, a scheduler 304, a MIMO encoder 305, a beamformer/precoder 306, a channel estimation module 307, and a plurality of transceivers 311-314 coupled to a plurality of antennas 315-318, respectively. STA 321 comprises memory 322, a processor 323, a MIMO decoder 325, a detection module 326, a channel estimation module 327, and a plurality of transceivers 331-332 coupled to a plurality of antennas 335-336, respectively. Similarly, STA 341 comprises memory 342, a processor 343, a MIMO decoder 345, a detection module 346, a channel estimation module 347, and a plurality of transceivers 351-352 coupled to a plurality of antennas 355-356, respectively.

Figure 4:
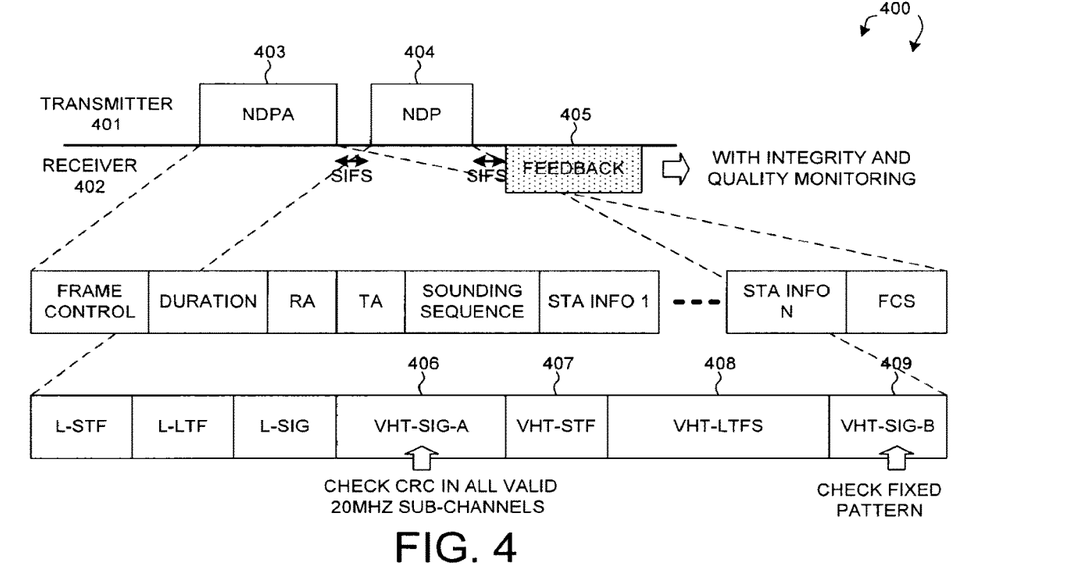
FIG. 4 illustrates a channel sounding and feedback process in a wireless system in accordance with one novel aspect.

FIG. 4 illustrates a channel sounding and feedback process in a wireless system 400 in accordance with one novel aspect. Wireless system 400 comprises a transmitting device 401 and a receiving device 402. During the channel sounding and feedback process, transmitting device 401 sends a sounding announcement (e.g., null data packet announcement (NDPA) 403) followed by a sounding packet (e.g., null data packet (NDP) 404,) to receiving device 402. NPDA 403 is transmitted first to inform the intended receiving device (e.g., via STA INFO fields) and NDP 404 is then transmitted for the intended receiving device to estimate the channel. Receiving device 402 then transmits a feedback packet 405 back to transmitting device 401. The feedback information includes estimated CSI (beamforming report) and SNR information.

NPD 404 is used for channel sounding and measurement. The L-STF, L-LTF, L-SIG fields are used for setting up the protection field against legacy devices. The signaling information for the NDP signal is carrier in the VHT-SIG-A 406 and the channel estimation is performed on the VHT-LTFS (Long Training Fields) 408. The wideband VHT signal uses duplicate signal format that replicates the 20 MHz waveform in each of the 20 MHz sub-channels that is being used. The signal content in VHT-SIG-A 406 is protected with a binary convolution code and an eight-bit CRC (Cyclic Redundancy Code). The VHT-SIG-B symbol 409 carriers a fixed pattern and is binary convolution code encoded. The VHT-STF 407 and VHT-LTFs 408 also carry fixed patterns but have no CRC protection.

There are various ways to monitor the integrity and/or quality of the sounding process by checking the sounding packet NDP 404. The integrity is a binary measure of whether or not the channel measurement as described is corrupted by external interfering signal from other devices or other external radiator to the extent that it can affect the MU-MIMO transmission and reception. The quality indicator, on the other hand, is a quantitative measure of the extent the channel measurement is corrupted by external interfering signal from other devices or other external radiators. The specific method for integrity and/or quality monitoring (or interference detection) is not an essential part of the invention.

In a first embodiment, a conventional technique of checking CRC is utilized. Because replicated 20 MHz waveform is used in each 20 MHz sub-channel within the signal transmission bandwidth, the receiver typically only checks the CRC in the primary sub-channel, which leads to insufficient integrity and/or quality monitoring. A more thorough approach is to check CRC for VHT-SIG-A 406 in all 20 MHz sub-channels. In a second embodiment, a technique of CCA (Clear Channel Assessment) prior to the arrival of the sounding packet is utilized. In a third embodiment, the fixed pattern in VHT-SIG-B symbol 409 is verified for monitoring the integrity and/or quality of the sounding signal. Note that checking the VHT-SIG-B pattern provides detection of corruption of the sounding signal if interference occurs after VHT-SIG-A.

Figure 5:
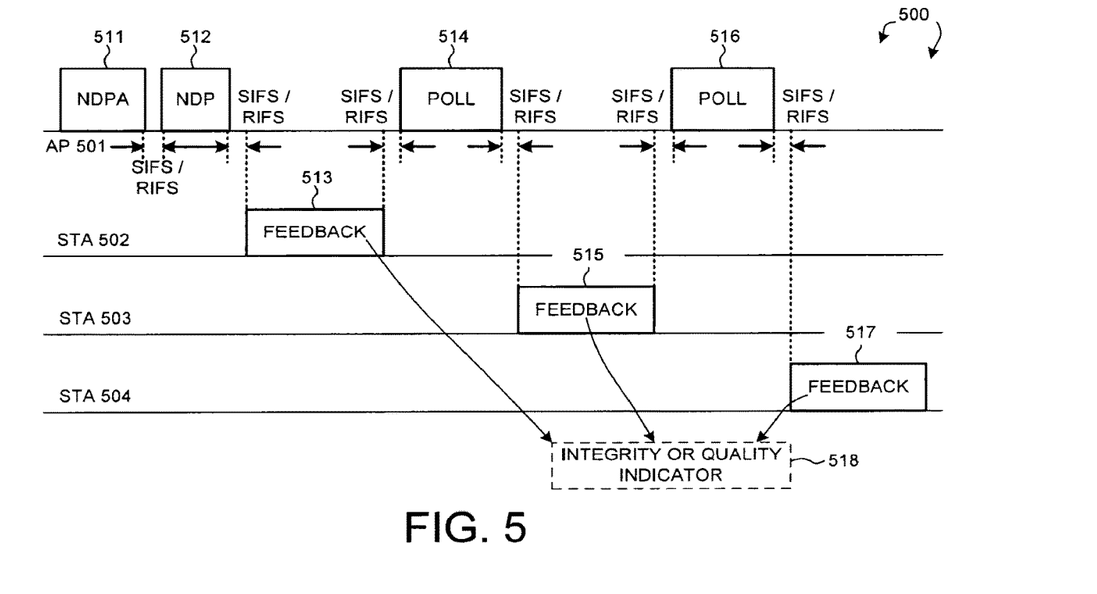
FIG. 5 illustrates a MU-MIMO sounding and feedback process in a wireless system in accordance with one novel aspect.

FIG. 5 illustrates a MU-MIMO sounding and feedback process in a wireless system 500 in accordance with one novel aspect. Wireless system 500 comprises a transmitting access point AP501 and three receiving stations STA502-504. For downlink transmission, AP501 (initiator) first broadcasts a sounding announcement NDPA 511 to inform the intended stations (responders) and a sounding signal NDP 512 is then transmitted for the intended responders. Based on the received sounding signal, each station measures the downlink channel and estimates CSI and SNR. For uplink transmission, STA502 transmits feedback message 513 after receiving NDP 512 (with SIFS/RIFS), STA503 transmits feedback packet 515 after receiving polling message 514, and STA504 transmits feedback message 517 after receiving polling message 516.

Depending on the monitoring result of the integrity and/or quality of the sounding process, each station can provide feedback information accordingly. In one preferred embodiment, the feedback information contains an integrity indicator having a plurality of bits, and each bit represents the integrity of the channel measurement of a valid sub-channel. In another preferred embodiment, the feedback information contains a quality indicator having a plurality of values, and each value represents the quality of channel measurement of a valid sub-channel. In yet another embodiment, the feedback information contains both integrity and quality indicators for each valid sub-channel. Furthermore, for wide channel bandwidth frame exchange, it is preferred to have integrity and/or quality indicators for each of the valid sub-channels within the transmission bandwidth.

Figure 6:
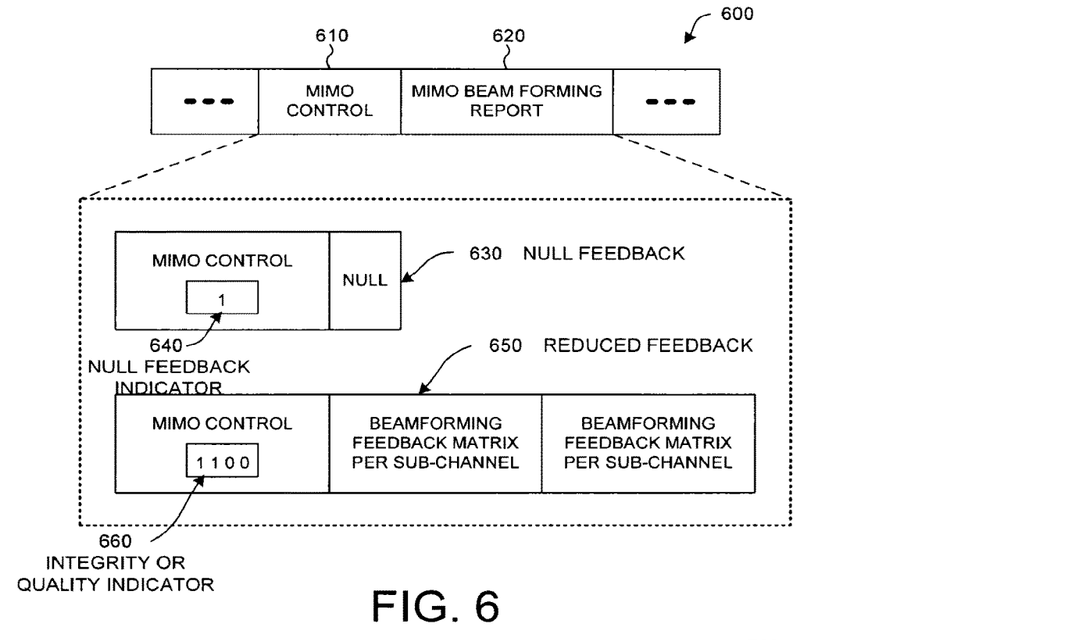
FIG. 6 illustrates a novel feedback frame format in an IEEE 802.11ac wireless system.

FIG. 6 illustrates a novel feedback frame format in an IEEE 802.11ac wireless system. In the example of FIG. 6, the CSI feedback information (beamforming report) is carried by a MIMO management frame 600, which includes a MIMO control subfield 610, and a beamforming report subfield 620. In a first embodiment, a primary sub-channel suffers significant channel degradation. To reduce overhead, the receiver does not transmit any beamforming report in the feedback by transmitting a NULL feedback 630, which may be indicated by a NULL feedback indicator 640 in the MIMO control subfield. In a second embodiment, a secondary sub-channel suffers significant channel degradation. To reduce overhead, the receiver transmits reduced feedback 650, which may be indicated by an integrity indicator 660 in the MIMO control subfield. The reduced feedback includes only beamforming report for non-corrupted primary sub-channels, while beamforming report for corrupted sub-channels are not included in the feedback message. For example, for an 80 MHz channel, the integrity indicator 660 contains four bits 1100 indicating that the first two 20 MHz sub-channels are good, while the next two 20 MHz sub-channels are degraded, and reduced feedback 650 includes beamforming report only for the first two 20 MHz sub-channels.

Figure 7:
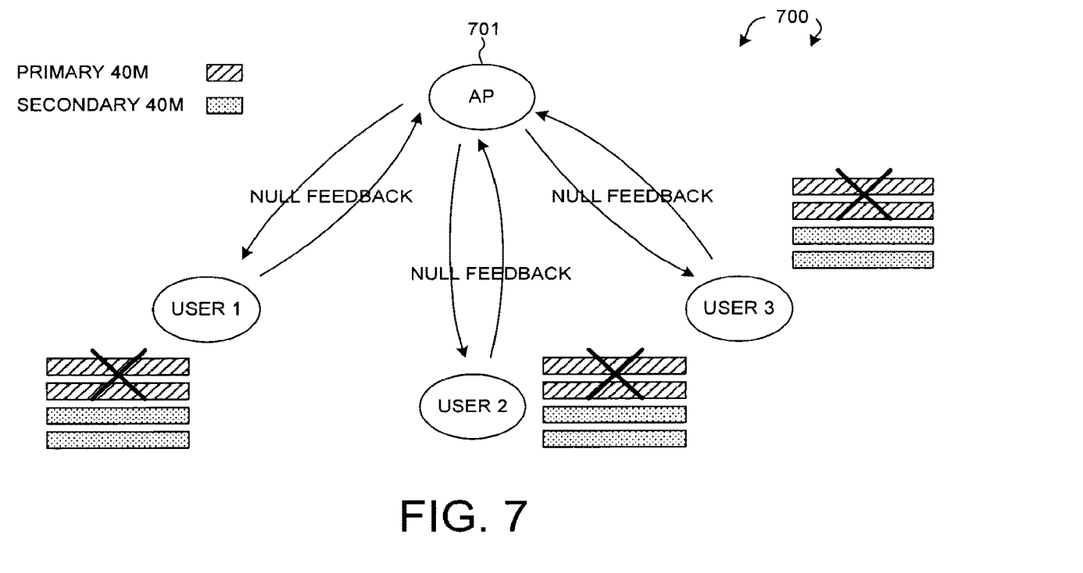
FIG. 7 illustrates a first embodiment of a novel feedback mechanism in an MU-MIMO wireless system.

FIG. 7 illustrates the first embodiment of a novel feedback mechanism in an MU-MIMO wireless system 700. Wireless system 700 comprises an AP701 and three mobile stations including a first user1, a second user 2, and a third user 3. AP701 communicates with the mobile stations over an 80 MHz BSS (basic service set) having a primary 40 MHz sub-channel and a secondary 40 MHz sub-channel. After channel sounding, all three users detect that the sounding signal is interfered over the primary 40 MHz sub-channel, and conclude that the primary 40 MHz sub-channel is significantly degraded. Based on the detected channel quality information, each user may transmit a NULL feedback (e.g., 630 in FIG. 6) to inform AP701 that the primary sub-channel measurement is corrupted and no beamforming report is provided to reduce feedback overhead. Based on the NULL feedback, AP701 may decide to repeat the sounding process to obtain a clean uncorrupted channel measurement and feedback.

Figure 8:
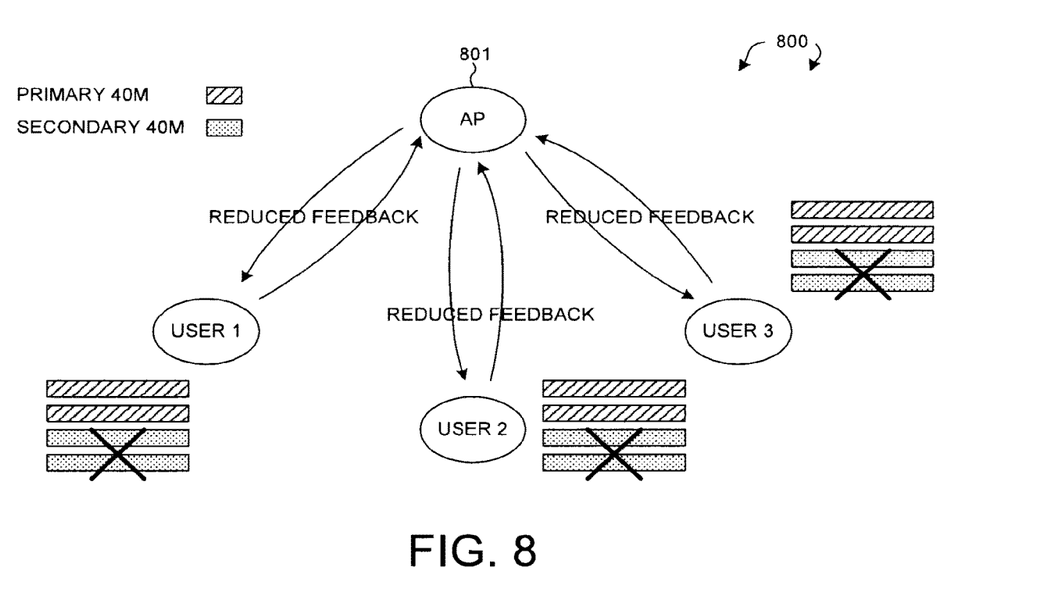
FIG. 8 illustrates a second embodiment of a novel feedback mechanism in an MU-MIMO wireless system.

FIG. 8 illustrates the second embodiment of a novel feedback mechanism in an MU-MIMO wireless system 800. Wireless system 800 comprises an AP801 and three mobile stations including a first user1, a second user 2, and a third user 3. AP801 communicates with the mobile stations over an 80 MHz BSS (basic service set) having a primary 40 MHz sub-channel and a secondary 40 MHz sub-channel. After channel sounding, all three users detect that the sounding signal is interfered over the secondary 40 MHz sub-channel, and conclude that the secondary 40 MHz sub-channel is significantly degraded. Based on the detected channel quality information, each user may transmit reduced feedback (e.g., 650 in FIG. 6) to inform AP801 that the secondary 40 MHz sub-channel measurement is corrupted and its beamforming report is not provided. Based on the reduced feedback, AP801 may decide to narrow the transmission bandwidth to allow MU-MIMO transmission only in the uncorrupted primary 40 MHz sub-channel.

Figure 9:
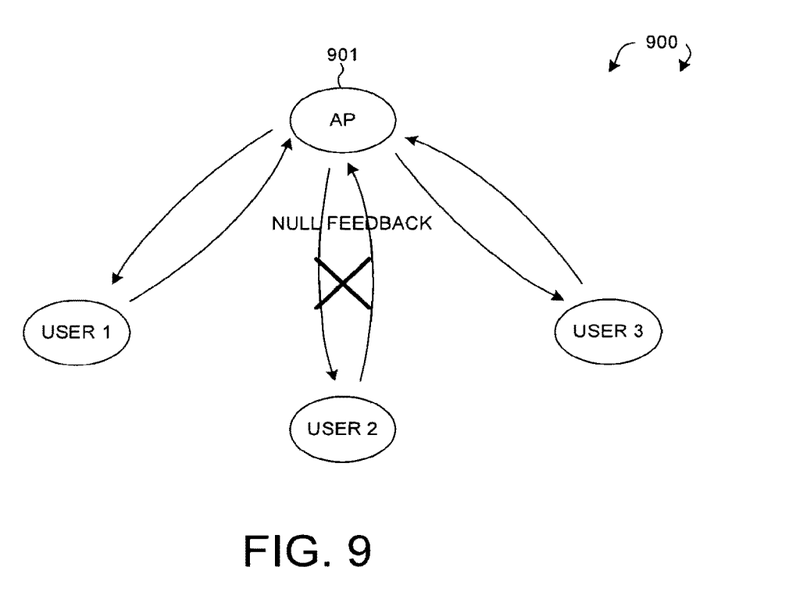
FIG. 9 illustrates a third embodiment of a novel feedback mechanism in an MU-MIMO wireless system.

In MU-MIMO, because the transmit beamforming weight is computed from aggregate channel measurements from multiple receivers (users), one incorrect feedback may produce a corrupted transmit precoding weights for all receivers involved in the sounding and feedback process. FIG. 9 illustrates a third embodiment of a novel feedback mechanism in an MU-MIMO wireless system 900. Wireless system 900 comprises an access point AP901 and three mobile stations including a first user1, a second user 2, and a third user 3. After channel sounding, user 1 and user 3 do not detect channel measurement corruption and thus provide good integrity indicator and CSI feedback (beamforming report) to AP901. User 2, on the other hand, detects channel measurement corruption and provides a NULL feedback to AP901. Based on the feedback from the users, AP901 may select only the responders (user 1 and user 3) who have indicated uncorrupted channel sounding for MU-MIMO transmission, and not transmitting to the responder (user2) whose channel sounding is corrupted. If the MU-MIMO transmission requires transmitting radio signals to all responders, then transmitting NDPs can be regarded as no transmission.

Figure 10:
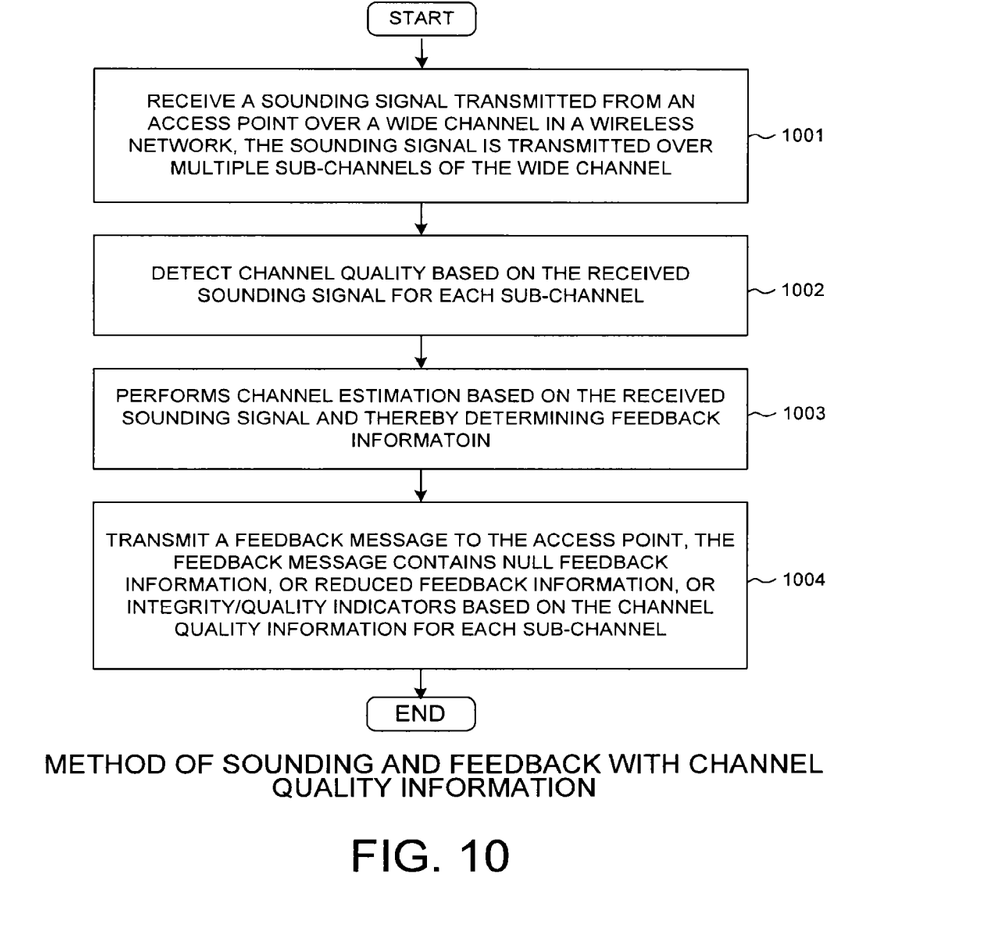
FIG. 10 is a flow chart of a method of sounding and reduced feedback from station perspective in accordance with one novel aspect.

FIG. 10 is a flow chart of a method of sounding and reduced feedback from mobile station perspective in accordance with one novel aspect. In step 1001, a receiving station receives a sounding signal transmitted from an access point over a wide channel in a wireless network. The sounding signal is transmitted over multiple sub-channels of the wide channel. In step 1002, the receiving station detects channel quality information based on the received sounding signal for each sub-channel. In step 1003, the receiving station performs channel estimation and determining feedback information for each sub-channel. In step 1004, the receiving station transmits a feedback message to the access point. The feedback message contains NULL feedback information, reduced feedback information, and/or integrity/quality indicators based on the detected channel quality information for each sub-channel.

Figure 11:
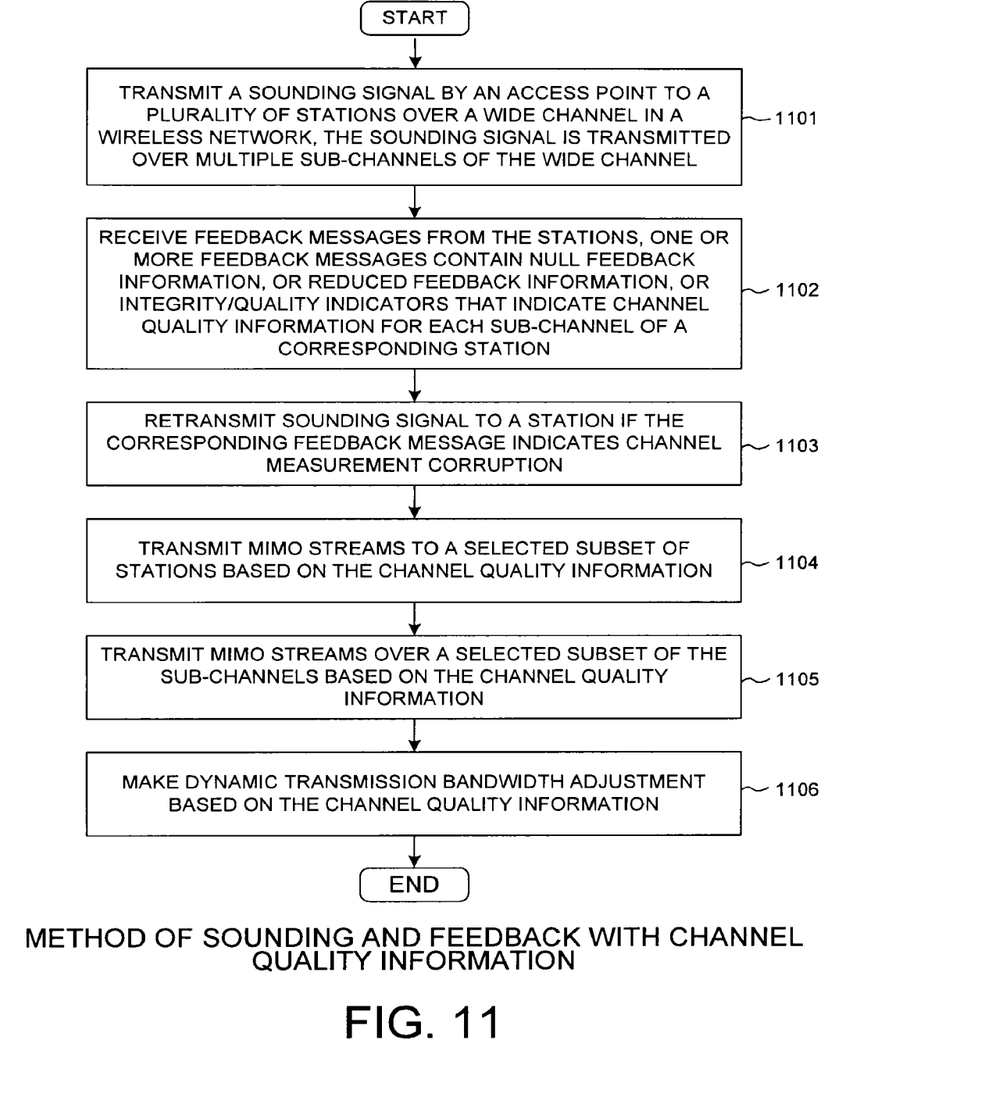
FIG. 11 is a flow chart of a method of sounding and reduced feedback from access point perspective in accordance with one novel aspect.

FIG. 11 is a flow chart of a method of sounding and reduced feedback from access point perspective in accordance with one novel aspect. In step 1101, an access point transmits a sounding signal to a plurality of mobile stations over a wide channel in the wireless network. The sounding signal is transmitted over multiple sub-channels of the wide channel. In step 1102, the access point receives feedback messages from the plurality of stations. One or more feedback messages contain NULL feedback information, reduced feedback information, and/or integrity indicators that indicate channel quality information for each sub-channel of a corresponding station. In step 1003, the access point retransmits a sounding signal to a station if the corresponding feedback message indicates channel measurement corruption. In step 1004, the access point transmits MU-MIMO streams to a selected subset of the plurality of stations based on the channel quality information. In step 1005, the access point transmits MU-MIMO streams over a selected subset of the multiple sub-channels based on the channel quality information. In step 1006, the access point makes dynamic transmission bandwidth adjustment decision based on the channel quality information in the feedback messages.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method for enhancing the robustness of a channel sounding process comprising:
   receiving a sounding signal transmitted from an access point over a wide channel in a wireless network by a device, wherein the sounding signal is transmitted over at least one sub-channels of the wide channel, and the at least one sub-channels comprises a primary sub-channel and a secondary sub-channel; and
   performing channel estimation based on the received sounding signal,
   wherein the device does not transmit any beamforming report to the access point when a result of the channel estimation indicates that the primary sub-channel suffers significant degradation, regardless of whether the secondary sub-channel suffers degradation or not, and the device transmits a feedback message with a beamforming report to the access point when the result of the channel estimation indicates that the primary sub-channel does not suffer significant degradation and the secondary sub-channel suffers significant degradation.

2. The method of claim 1, wherein the sounding signal and the feedback message are transmitted for MU-MIMO sounding and feedback, or for beamforming sounding and feedback.

3. The method of claim 1, wherein performing channel estimation involves performing clear channel assessment (CCA) prior to the arrival of the sounding signal in the at least one sub-channels.

4. The method of claim 1, wherein performing channel estimation involves checking a cyclic redundancy check (CRC) for each sub-channel of the at least one sub-channels.

5. The method of claim 1, wherein the sounding signal contains a VHT-SIG-B field, and wherein performing channel estimation involves checking whether a bit pattern of the VHT-SIG-B field equals to a fixed pattern.

6. The method of claim 1, wherein the feedback information only includes the beamforming report for one or more sub-channels that do not suffer significant degradation, wherein the one or more sub-channels that do not suffer significant degradation comprise the primary sub-channel.

7. The method of claim 1, wherein the feedback message comprises an integrity indicator comprising a plurality of bits, each bit indicates whether or not each corresponding sub-channel suffers significant degradation.

8. The method of claim 1, wherein the feedback message comprises quality indicator, and the quality indicator have a plurality of values corresponding to the plurality of sub-channels, respectively, wherein each value represents a quantitative measure of the extent that measurement of the corresponding sub-channel is corrupted by the interference.

9. The method of claim 1, wherein the device does not transmit any beamforming report to the access point when the result of the channel estimation indicates that the primary sub-channel suffers significant degradation and the secondary sub-channel does not suffer significant degradation.

10. A device, comprising:
    a receiver that receives a sounding signal transmitted from an access point over a wide channel in a wireless network, wherein the sounding signal is transmitted over at least one sub-channels of the wide channel, wherein the at least one sub-channels comprises a primary sub-channel and a secondary sub-channel;
    a processor that performs channel estimation based on the received sounding signal; and
    a transmitter that does not transmit any beamforming report when a result of the channel estimation indicates that the primary sub-channel suffers significant degradation, regardless of whether the secondary sub-channel suffers degradation or not, and transmits a feedback message with a beamforming report to the access point when the result of the channel estimation indicates that the primary sub-channel does not suffer significant degradation and the secondary sub-channel suffers significant degradation.

11. The device of claim 10, wherein the sounding signal and the feedback message are transmitted for MU-MIMO sounding and feedback, or for beamforming sounding and feedback.

12. The device of claim 10, wherein the sounding signal contains a VHT-SIG-B field, wherein performing channel estimation involves verifying whether a bit pattern of the VHT-SIG-B field equals to a fixed pattern or not.

13. The device of claim 10, wherein the feedback information only includes the beamforming report for one or more sub-channels that do not suffer significant degradation, wherein the one or more sub-channels that do not suffer significant degradation comprise the primary sub-channel.

14. The device of claim 10, wherein the feedback message comprises an integrity indicator comprising a plurality of bits, each bit indicates whether each corresponding sub-channel suffers significant degradation or not.

15. The device of claim 10, wherein the feedback message comprises quality indicator, and the quality indicator have a plurality of values corresponding to the plurality of sub-channels, respectively, wherein each value represents a quantitative measure of the extent that measurement of the corresponding sub-channel is corrupted by the interference.

16. The device of claim 10, wherein the transmitter does not transmit any beamforming report when the result of the channel estimation indicates that the primary sub-channel suffers significant degradation and the secondary sub-channel does not suffer significant degradation.

17. A method for enhancing the robustness of a channel sounding process, comprising:
    (a) transmitting a sounding signal by an access point to a plurality of stations over a wide channel in a wireless network, wherein the sounding signal is transmitted over at least one sub-channels of the wide channel, and the at least one sub-channels comprises a primary sub-channel and a secondary sub-channel; and
    (b) the access point does not receive any beamforming report from a first station when a result of channel estimation of the first station is that the primary sub-channel suffers significant degradation, regardless of whether the secondary sub-channel suffers degradation or not, and the access point receives a first feedback message with a beamforming report from the first station when the result of channel estimation of the first station is that the primary sub-channel does not suffer significant degradation and the secondary sub-channel suffers significant degradation.

18. The method of claim 17, wherein the first feedback message comprises the beamforming report only for one or more sub-channels that do not suffer significant degradation, wherein the one or more sub-channels that do not suffer significant degradation comprise the primary sub-channel.

19. The method of claim 17, wherein the access point transmits multi-user multiple-input multiple-output (MU-MIMO) signals to a selected subset of the plurality of stations based on the first feedback message and a second feedback message from a second station.

20. The method of claim 17, wherein the access point transmits multi-user multiple-input multiple-output (MU-MIMO) signals over a selected subset of the sub-channels based on the first feedback message and a second feedback message from a second station.

* * * * *